(12) United States Patent
Funahashi et al.

(10) Patent No.: US 7,477,839 B2
(45) Date of Patent: Jan. 13, 2009

(54) WATERPROOF HOUSING

(75) Inventors: Koji Funahashi, Tokorozawa (JP); Shinichi Watanabe, Kawaguchi (JP)

(73) Assignee: Olympus Imaging Corporation, Tokyo (JP)

( * ) Notice: Subject to any disclaimer, the term of this patent is extended or adjusted under 35 U.S.C. 154(b) by 361 days.

(21) Appl. No.: 11/344,714

(22) Filed: Feb. 1, 2006

(65) Prior Publication Data

US 2006/0193615 A1   Aug. 31, 2006

(30) Foreign Application Priority Data

Feb. 28, 2005   (JP) .............................. 2005-055107

(51) Int. Cl.
*G03B 17/08* (2006.01)
(52) U.S. Cl. .............................. 396/25; 396/27; 396/29; 396/297; 396/299
(58) Field of Classification Search .................... 396/27, 396/29, 297, 299, 25
See application file for complete search history.

(56) References Cited

U.S. PATENT DOCUMENTS

| 3,241,467 | A | * | 3/1966 | Young | .......................... | 396/27 |
| 6,434,330 | B1 | * | 8/2002 | Uchiyama et al. | ............. | 396/27 |

FOREIGN PATENT DOCUMENTS

JP   2003-107570   4/2003

* cited by examiner

*Primary Examiner*—Rochelle-Ann J Blackman
*Assistant Examiner*—Michael A Strieb
(74) *Attorney, Agent, or Firm*—Volpe and Koenig, P.C.

(57) ABSTRACT

A waterproof housing is provided with an engaging member that can engage with rotary members provided respectively on a plurality of cameras. The rotary members can be rotated from the outside of the waterproof housing. Accordingly, the plurality of cameras can be stored and operated selectively in a single waterproof housing. For example, the engaging member can be configured in such a manner that a plurality of multiple recessed portions are provided concentrically so that each one of the plurality of rotary members can be fitted to any one of the recessed portion out of the multiple recessed portions.

7 Claims, 15 Drawing Sheets

WATERPROOF HOUSING

CROSS-REFERENCE TO RELATED APPLICATION

This application is based upon and claims the benefit of priority from prior Japanese Patent Application No. 2005-055107, filed on Feb. 28, 2005, the entire contents of which are incorporated herein by reference.

BACKGROUND OF THE INVENTION

1. Field of the Invention

The present invention relates to a waterproof housing (waterproof protector, waterproof case) for storing a camera such as a film camera, a digital camera, a video camera so that a user can operate the camera from the outside of the housing. The invention specifically relates to a waterproof housing that enables operation of a rotary dial such as a mode dial from the outside.

2. Description of the Related Art

A waterproof housing (waterproof protector, a waterproof case) for fitting and storing a camera therein for performing underwater photography is known. The waterproof housing is provided with a switch operating member that can operate one of various switches (including dials and buttons) of the camera from the outside of the camera.

Since many of the camera switches are push buttons, a user can operate (push) a switch of a camera from the outside by configuring the switch operating member of the waterproof housing with push button of an automatic restoring type. The push button of the automatic restoring type returns to an initial position (projected position) by an urging force such as a spring force of a compression coil when the pushing force is removed.

However, a mode switch of a camera for setting the photographing mode such as a program mode, a scene mode, and an underwater photography mode is composed of disk-shaped rotary dial. Therefore, it is necessary to exert a rotational force to the rotary dial from the outside of the housing to rotate the same.

For example, JP-A-2003-107570 discloses a structure in which a power transmission ring is fixed to a distal end (lower end) of a push button of the automatic restoring type of a waterproof housing. The power transmission ring is formed with two projections apart from each other by 180°, and rubber engaging members are provided on the inner sides of the projections respectively. In general, axial grooves such as knurls are formed on a peripheral surface of a rotary dial (for example, the mode switch) for resisting slippage. Therefore, axial recesses and projections which can be engaged with the grooves on the peripheral surface of the rotary dial are formed respectively on the inner sides of the engaging members of the push button.

When the push button of the waterproof housing is pushed in this structure, the two engaging members are moved downward so as to pinch the rotary dial, whereby the recesses and projections of the engaging members of the push button are engaged with the grooves on the rotary dial. Therefore, when the push button of the waterproof housing is rotated in a state in which the push button is pushed, the rotary dial of the camera can be rotated and operated from the outside of the housing.

In this structure, since the engaging members are formed of rubber, the engaging members are engaged with the knurls on the rotary dial firmly without giving damage to the rotary dial of the camera. Therefore, the rotational force of the push button is transmitted to the rotary dial, whereby the rotary dial can be rotated.

Since the power transmission ring at the distal end of the push button is covered on the rotary dial of the camera in a state in which the rotary dial (mode switch) of the camera is clipped from both sides by the two rubber engaging members, lateral deformation of the push button is prevented. Therefore, there is no possibility of occurrence of water leakage between an insertion hole for the push button formed on the waterproof housing and the push button.

BRIEF SUMMARY OF THE INVENTION

The waterproof housing of the invention enables storage of one of a plurality of cameras different from each other exchangeably. The waterproof housing is provided with an engaging member that can be engaged with a rotary member provided respectively on the plurality of cameras, so that the rotary member of the stored camera can be rotated by rotating the engaging member in the waterproof housing.

Therefore, one of a plurality of cameras can be stored and operated selectively by a single waterproof housing.

For example, a plurality of multiple recessed portions may be provided concentrically on the engaging member so as to be capable of engaging with the rotary members of various shapes, so that each one of the plurality of rotary members can fit one of the recesses of the multiple recessed portions. In a case in which the engaging portion is provided inside of the waterproof housing and an operating member connected to the engaging portion so that a user can rotate the engaging member is provided outside of the waterproof housing, it can be configured in such manner that the user can operate the operating member from the outside of the waterproof housing and rotate the engaging portion, thereby rotating the rotary member of the camera engaged with the engaging portion.

When the recesses and projections (for example, grooves) that are engaged with the recesses and the projections formed on the surface of the rotary member of the camera is formed on side surfaces of the inner side of the recessed portions, engagement between the engaging member and the rotary member of the camera is further enhanced.

For example, when a camera has a plurality of rotary members, the engaging member can be configured so as to be capable of engaging with the engaging grooves provided on exposed portions of the plurality of the rotary members. In this case, a plurality of types of the projections can be formed depending on the figures of the plurality of rotary members.

The engaging member can be configured to be engaged with the rotary member so as to cover the exposed portion of the rotary member. Alternatively, the engaging member can also be configured to have a portion that covers at least a part of the rotary member and a plurality of types of projections that engage the engaging grooves provided on the exposed portions of the rotary member.

The rotary member is, for example, a mode dial of the camera or a power switch of the camera, but it is not limited thereto.

When the rotary member on the camera has a multiple structure such as a dual-dial, a plurality of engaging members can be provided inside of the waterproof housing corresponding to the respective rotary members. In this case, operating members corresponding to the respective engaging members can be provided outside of the waterproof housing, so that transmitting forces can be transmitted from the respective operating members to the corresponding engaging portions by a coaxial multiple axes.

According to the invention, the dial engaging portion can be engaged with the rotary dials of the plurality of different cameras, so that various the rotary dials can be operated from the outside, and hence the waterproof housing can be commonly used for the plurality of different cameras.

BRIEF DESCRIPTION OF THE SEVERAL VIEWS OF THE DRAWINGS

These and other features, aspects, and advantages of the apparatus and methods of the invention will become better understood with regard to the following description, appended claims, and accompanying drawings where:

DETAILED DESCRIPTION OF THE PREFERRED EMBODIMENTS

A preferred embodiment of the invention is described below with reference to the accompanying drawings.

A waterproof housing of the invention is provided with a dial engaging portion which can engage with rotary dials of a plurality of different cameras and can rotate the respective rotary dials.

Figure 1:
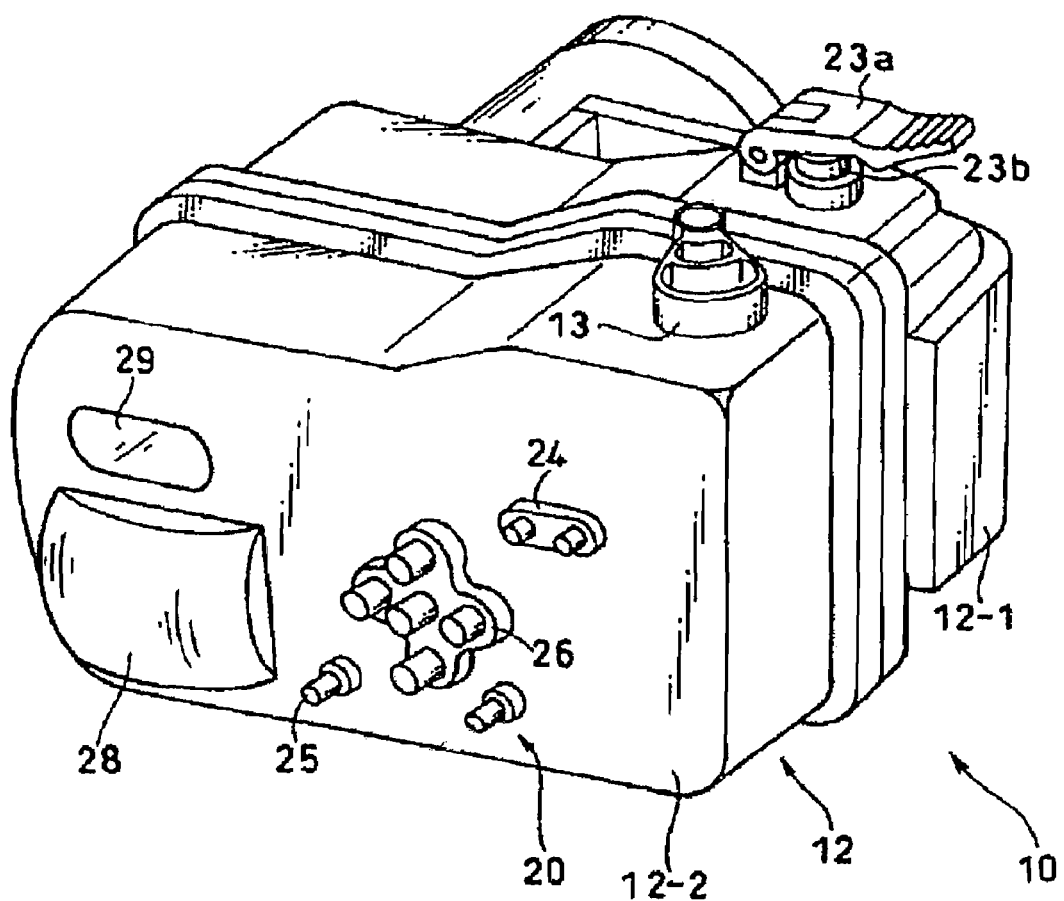
FIG. 1 is a back perspective view of a waterproof housing according to a first embodiment of the invention.

Referring now to the drawings, an embodiment of the invention will be described. FIG. 1 is a back perspective view of a waterproof housing 10 according to an embodiment of the invention. The waterproof housing is provided with a housing body 12 for storing a camera such as a digital camera. The basic structure of the housing body 12 is the same as the waterproof housing in the related art. In other words, the waterproof housing body 12 is formed by combining a body portion 12-1 and a back lid member 12-2 formed respectively of synthetic resin of a thickness which can resist a water pressure with a hinge, and various switch operating members 20 for operating the switches of the camera from the outside of the camera are provided on the body portion and the back lid member. The body portion 12-1 and the back lid member 12-2 of the waterproof housing body 12 are both formed of synthetic resin that transmits light so that the camera stored in the interior thereof can be viewed.

Figure 2B:
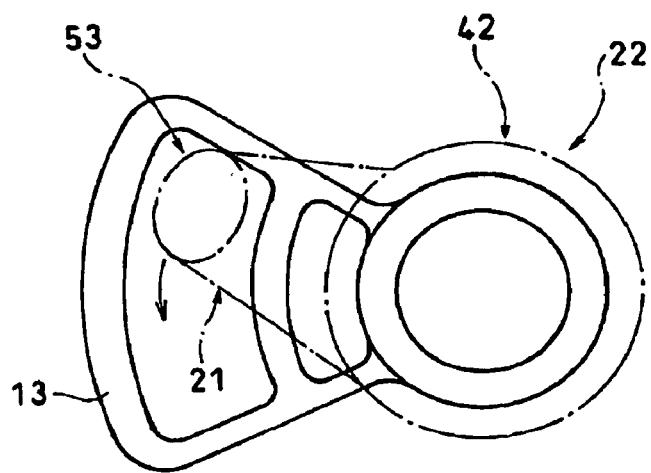
FIG. 2B is a partial plan view of the back lid member of the housing body of the waterproof housing in FIG. 1.
Figure 2A:
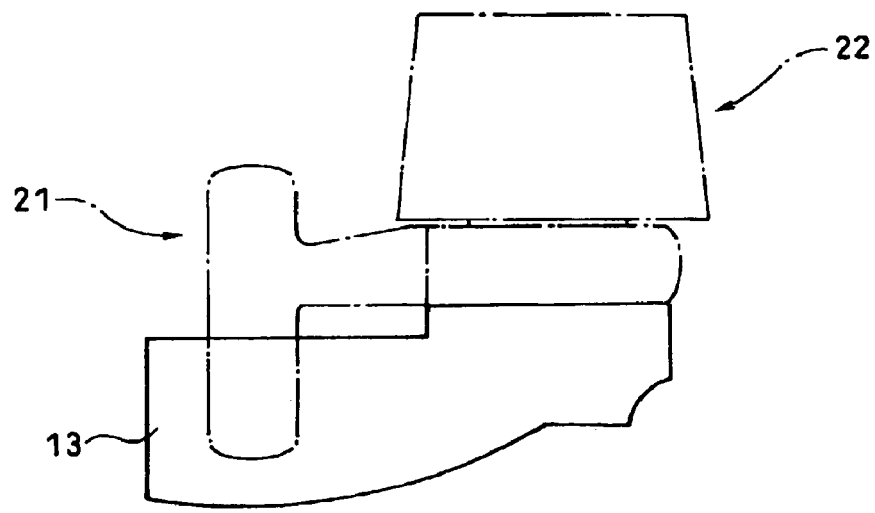
FIG. 2A is a partial side view of a back lid member of a housing body of the waterproof housing in FIG. 1.

Some of the switch operating members 20 of the waterproof housing 10 will be described in brief. FIGS. 2A and 2B show a part of the back lid member 12-2 of the housing body 12. FIG. 2A is a partial side view and FIG. 2B is a partial plan view. In FIGS. 2A and B, reference numeral 21 is a power switch operating member for operating the power switch for turning a power source of the camera ON and OFF, reference numeral 22 is a mode switch operating member for operating a mode switch of the camera, which sets the photographing modes such as a program mode, a scene mode, and an underwater photography mode. These parts are characteristic parts of the invention, and are described in detail later. In order to avoid complication of the drawings, the power switch operating member 21, the mode switch operating member 22 are omitted in FIG. 1, and are shown by hidden line in FIGS. 2A and 2B. A cylindrical projection 13 for storing the power switch operating member 21 and the mode switch operating member 22 is formed on an upper surface of the back lid member 12-2 of the housing body 12.

Returning back to FIG. 1, another switch operating member 20 will be described. Reference numeral 23a is a release operating member of a lever shape. When the release operating member 23a is pressed, a release button 23b located immediately below is moved downward, and a shutter is released, whereby photographing is performed. Reference numeral 24 is a zoom switch operating member for switching between Zoom-Wide and Zoom-Tele. Reference numeral 25 designates an operating member for setting the reproduction mode. Reference numeral 26 designates an operating member for a cross-shaped button for setting correction exposure, an image quality mode, a flash, a self timer, a close-up mode, and so on.

Reference numeral 28 designates a convex magnifier for observing a liquid-crystal display on the back surface of the camera. Reference numeral 29 designates also a convex magnifier for observing an optical finder on the back surface of the camera.

Figure 3B:
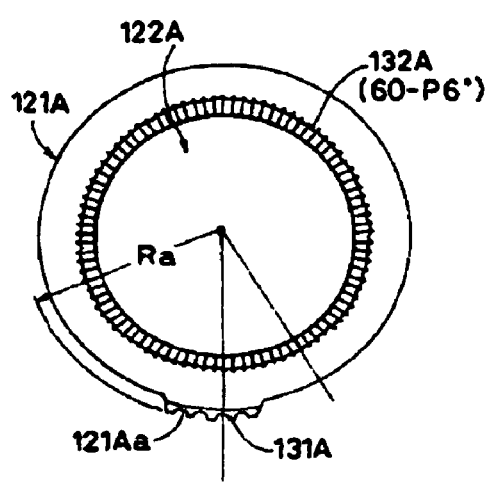
FIG. 3B is a plan view of the example of the coaxial multiple arrangement of the power switch and the mode switch of the camera in FIG. 3A.
Figure 3D:
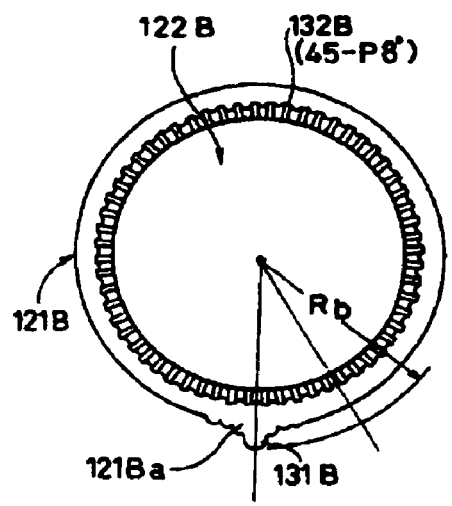
FIG. 3D is a plan view of an example of the coaxial multiple arrangement of the power switch and the mode switch of the camera in FIG. 3C.
Figure 3A:
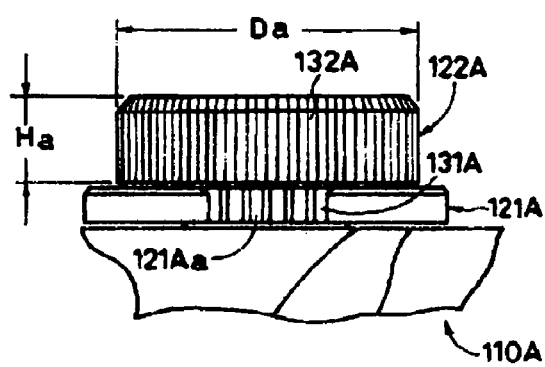
FIG. 3A is a side view of an example of a coaxial multiple arrangement of a power switch and a mode switch of a camera stored in the waterproof housing.
Figure 3C:
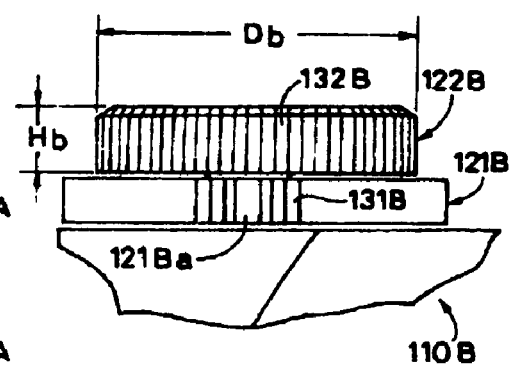
FIG. 3C is a side view of an example of the coaxial multiple arrangement of the power switch and the mode switch of the camera different from the one in FIG. 3A.

In a single lens reflex digital camera, in both of the power switch and the mode switch, a structure in which a mode switch of a small diameter is placed coaxially on a power switch of a large diameter as disk-shaped rotary dials is known. FIGS. 3A to 3D are views showing examples of coaxial dual arrangements of the power switches 121A, 121B and the mode switches 122A and 122B on the cameras 110A, 110B different from each other. FIG. 3A and FIG. 3C are partial side views including respectively the power switches 121A, 121B, and the mode switches 122A, 122B of the respective cameras 110A, 110B. FIG. 3B and FIG. 3D are respectively plan views of the power switches 121A, 121B and the mode switches 122A, 122B on the cameras 110A, 110B, respectively.

As shown in FIGS. 3A to 3D, the mode switch 122A of the camera 110A is smaller in diameter than the mode switch 122B of the camera 110B and thicker than the same. In other words, relations; Da (diameter of the mode switch 122A)<Db (diameter of the mode switch 122B), Ha (thickness of the mode switch 122A)>Hb (thickness of the mode switch 122B) are satisfied.

For example, engaging grooves (engaging portions) 132A, 132B for resisting slippage such as knurls of vertical groove shape are formed on the peripheral surfaces of the respective mode switches. The camera 110A is formed with sixty engaging grooves 132A at a pitch of 6°. The camera B is formed with forty-five engaging grooves 132B at a pitch of 8°. In other words, the engaging grooves on the camera 110B are formed at rougher pitch.

On the other hand, the power switches 121A, 121B are formed into substantially the same thickness. The power switches 121A, 121B are formed with switch strips (projections formed in the radial directions) 121Aa, 121Ba both integrally projecting sideways. The switch strip 121Ba of the camera 110B projects slightly larger than the switch strip 121Aa of the camera 110A in the radial direction. The vertical groove-shaped engaging portions 131A, 131B are respectively formed on the peripheral surfaces of the switch strips 121Aa, 121Ba.

While the engaging portion 131A of the power switch 121A are formed to have a uniform radius, the engaging portion 131B of the power switch 121B is formed into an angular shape projecting at a center thereof further in the radial direction. The center projection of the engaging portion 131B projects slightly larger than the engaging portion 131A in the radial direction. In other words, a radius Rb of the outermost diameter of the center projection of the engaging portion 131B is larger than a radius Ra of the outermost diameter of the engaging portion 131A (Rb>Ra).

The upper surfaces of the cameras 110A, 10B, which serve as references of the height of the power switch 121 and the mode switch 122 are located substantially at the same level.

In the invention, the waterproof housing 10 is configured in such a manner that the rotary dials (the power switch 121 and the mode switch 122) of a plurality (two in this embodiment) of the different cameras 110A, 110B are rotatable from the outside of the camera. Therefore, it can be used commonly for a plurality of different cameras. In this embodiment, not only the mode switch 122, but also the power switch 121 can be rotated.

Figure 4:
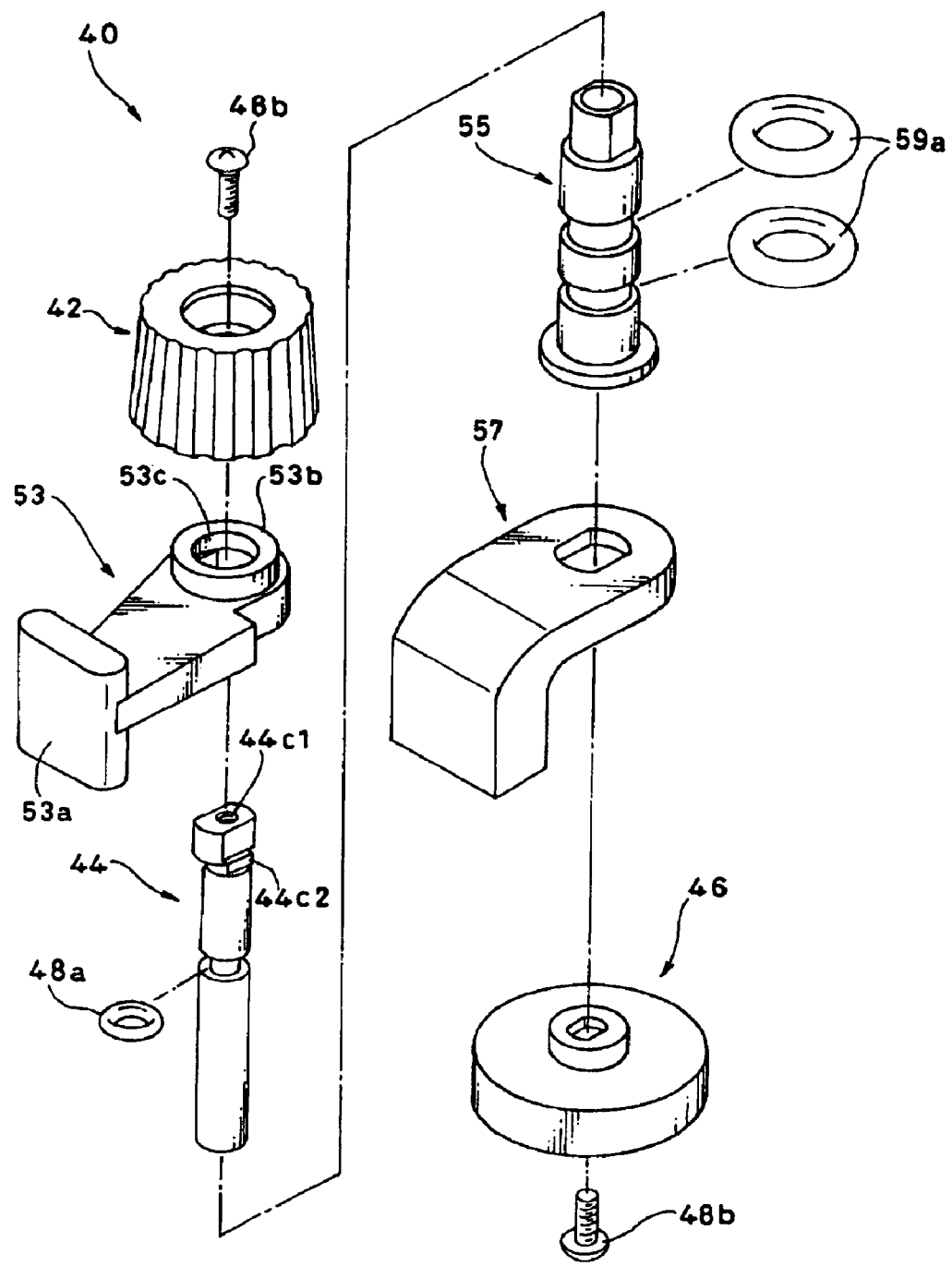
FIG. 4 is an exploded perspective view of a dual cylinder structure having a power switch operating member and a mode switch operating member assembled therein.
Figure 5:
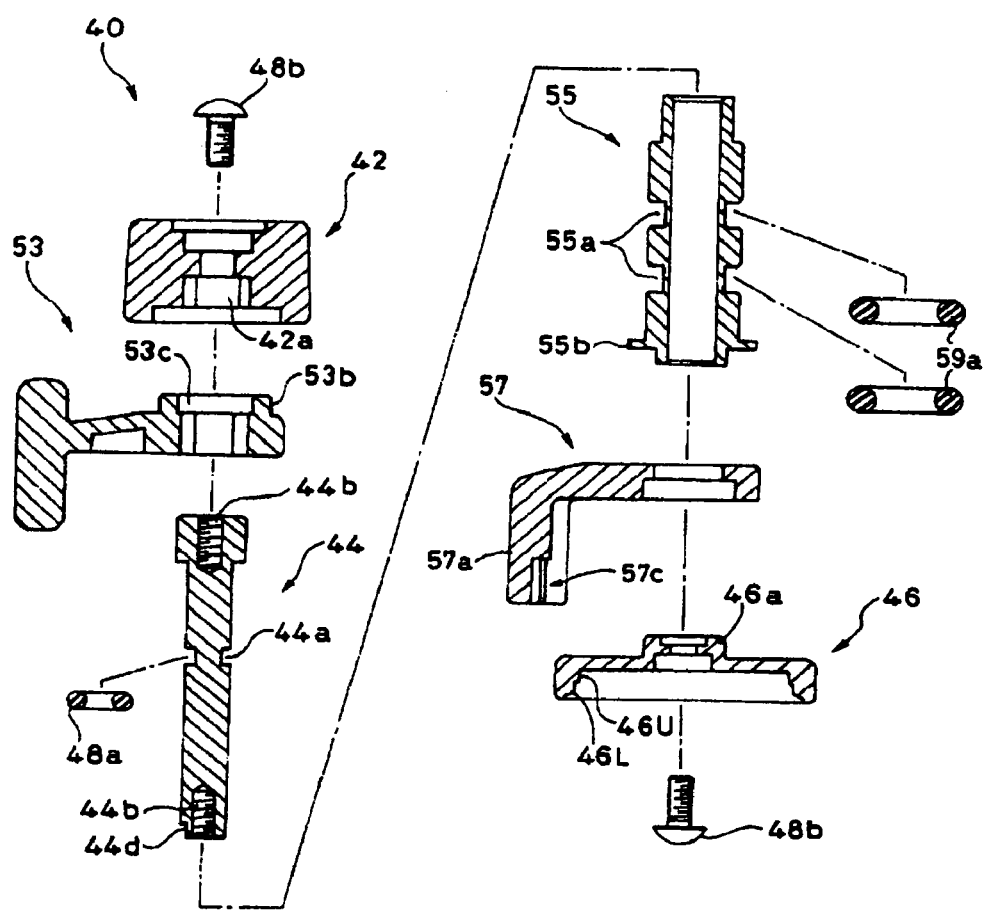
FIG. 5 is an exploded drawing of the dual cylinder structure in FIG. 4 shown in cross section.
Figure 6:
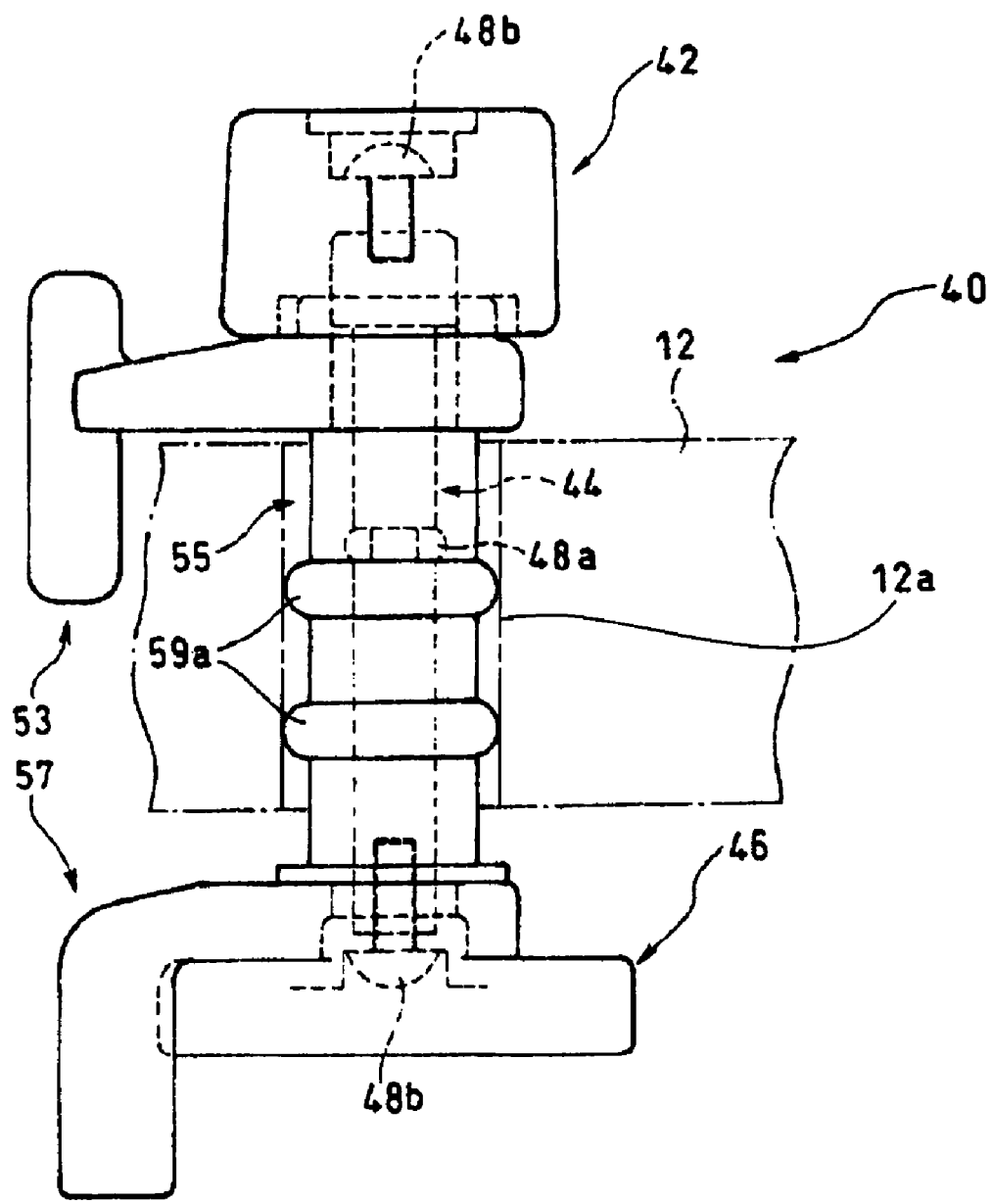
FIG. 6 is a front view of the dual cylinder structure in FIG. 4.
Figure 7A:
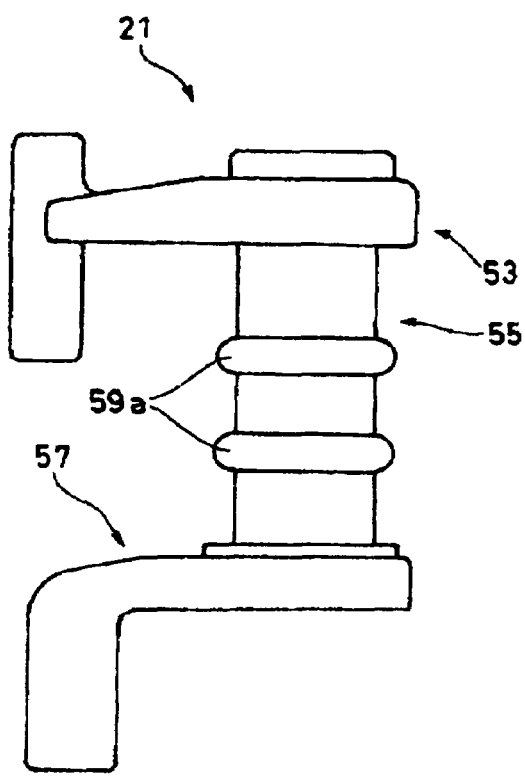
FIG. 7A is a front view of the power switch operating member.
Figure 7B:
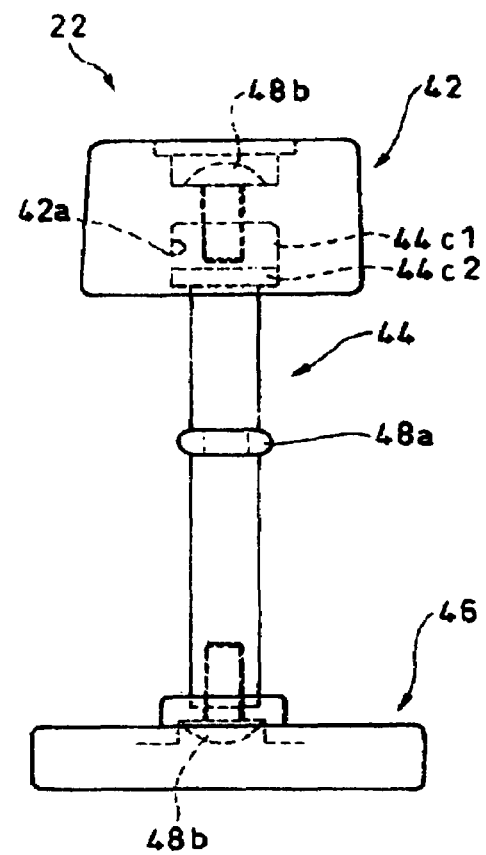
FIG. 7B is a front view of the mode switch operating member.

In this embodiment, the power switch operating member 21 and the mode switch operating member 22 of the waterproof housing 10 is assembled to a dual cylinder structure 40. FIG. 4 is an exploded perspective view of the dual cylinder structure 40; FIG. 5 is an exploded view of the dual cylinder structure 40 shown in cross-section; FIG. 6 is a front view of the dual cylinder structure 40; FIG. 7A is a front view of the power switch operating member 21; FIG. 7B is a front view of the mode switch operating member 22, respectively. As shown in FIGS. 7A and 7B, the outer cylinder structure of the dual cylinder structure 40 corresponds to the power switch operating member 21 and the inner cylinder structure corresponds to the mode switch operating member 22.

As shown in FIG. 4 and FIG. 5, the dual cylinder structure 40 includes a tab 42 of a cylindrical shape, a lever 53, a solid inner cylinder 44, a hollow outer cylinder 55, a substantially L-shaped engaging member 57, a flat cylindrical engaging member 46, an O-ring 48a of a small diameter, two O-rings 59a of a large diameter, and two screws 48b.

The combination thereof will be described in brief. The mode switch operating member 22 as the inner cylindrical structure is configured as follows. As shown in FIG. 6 and FIG. 7B, the two screws 48b are screwed into the solid inner cylinder 44 from above and below, and the tab 42 is secured to an upper end of the solid inner cylinder, and the engaging member 46 is secured to the lower end thereof respectively. The small diameter ring 48a is fitted to the small diameter portion 44a of the solid inner cylinder 44.

The power switch operating member 21 as the outer cylinder structure is configured as described below. As shown in FIG. 6 and FIG. 7A, a lever 53 is mounted to the upper end of the hollow outer cylinder 55 and the engaging member 57 is mounted to the lower end thereof using a notched surface (detailed description will be given later), respectively. The two O-rings 59a of the large diameter are fitted to a small diameter portion 55a of the hollow outer cylinder, respectively.

Figure 8B:
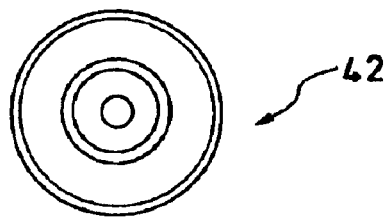
FIG. 8B is a plan view of the tab of the mode dial operating member.
Figure 8A:
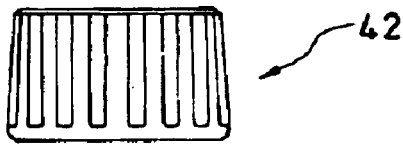
FIG. 8A is a front view of a tab of the mode dial operating member.
Figure 8C:
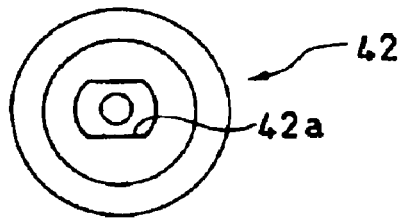
FIG. 8C is a bottom view of the tab of the mode dial operating member.

Subsequently, the respective components will be described. The members that constitute the mode switch operating member 22 as the inner cylinder structure will be described. The FIGS. 8A to 8C show the tab 42. FIG. 8A is a front view, FIG. 8B is a plan view, and FIG. 8C is a bottom view. The tab 42 is formed into a cylindrical shape, and the engaging portions for resisting slippage, such as knurls, in the form of vertical grooves (engaging grooves extending in parallel with the axis) are formed on the peripheral surface thereof. As shown in FIG. 5 and FIG. 8C, a second hole 42*a* on the tab 42 from the bottom is an elongated groove-shaped hole having flat side surfaces on both sides of the inner peripheral surfaces, that is, of an oval shape.

Figure 9B:
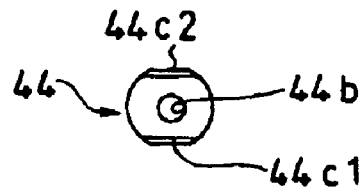
FIG. 9B is a plan view of the inner cylinder of the mode dial operating member.
Figure 9A:
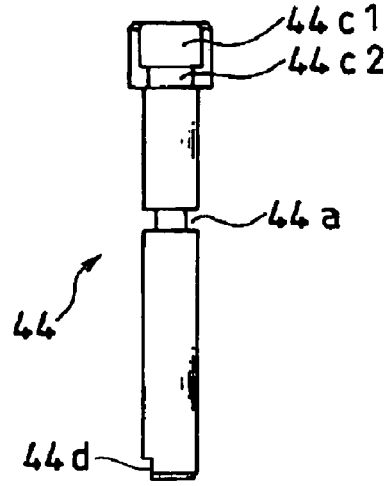
FIG. 9A is a front view of an inner cylinder of the mode dial operating member.

FIGS. 9A and 9B show the inner cylinder 44. FIG. 9A is a front view, and FIG. 9B is a plan view. As shown in FIG. 5, the inner cylinder 44 is formed into a solid structure, and is formed with screw holes 44*b* for screwing screws 48*b* at upper and lower ends thereof, and a small-diameter portion 44*a* to which the O-ring 48*a* is fitted at a midsection thereof. By screwing the screw 48*b* into the screw hole 44*b*, the tab 42 is secured to the upper end of the inner cylinder 44 and the engaging member 46 is secured to the lower end thereof. As shown in FIGS. 9A and 9B, the upper end portion of the inner cylinder 44 is formed with notched surfaces 44*c*1, 44*c*2 formed in two levels by cutting the both side surfaces of the outer peripheral surface thereof in parallel to each other. The notched surfaces 44*c*1 on the upper level can be engaged with the elongated groove-shaped holes 42*a* of the tab 42. In addition, the lower end portion of the inner cylinder 44 is formed with notched surface 44*d* formed by cutting only on one side at a position shifted from the notched surfaces 44*c*1, 44*c*2 by 90° in the circumferential direction. This notched surface serves as a detent of the engaging member 46 which is to be secured to the lower end of the inner cylinder with a screw.

Figure 10C:
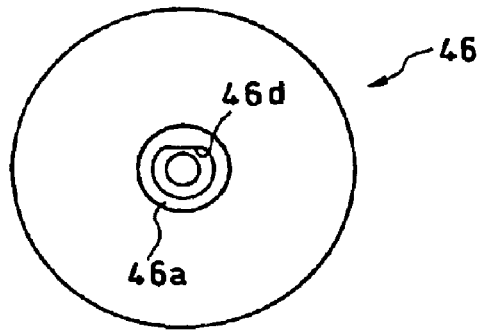
FIG. 10C is a plan view of the engaging member of the mode dial operating member.
Figure 10A:
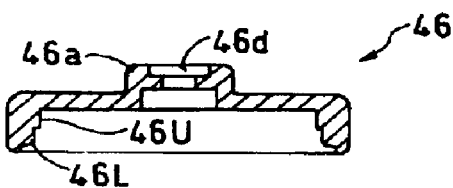
FIG. 10A is a cross-sectional view of an engaging member of the mode dial operating member.
Figure 10B:
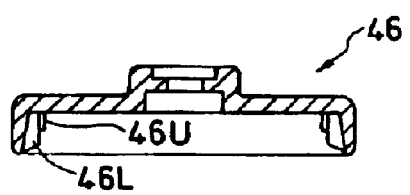
FIG. 10B is a cross-sectional view of the engaging member of the mode dial operating member in FIG. 10A taken along a different cross-section.
Figure 10D:
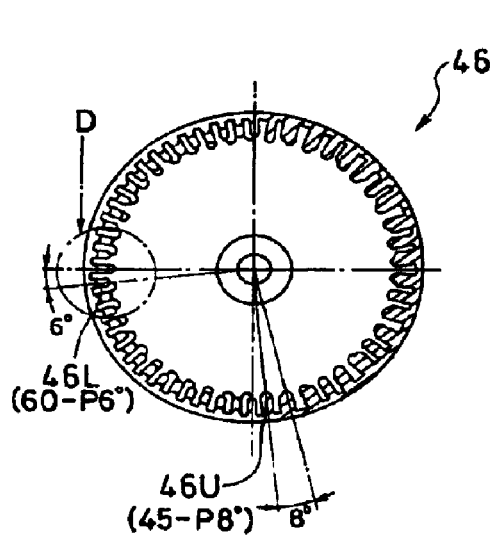
FIG. 10D is a bottom view of the engaging member of the mode dial operating member, wherein the right half portion is shown in cross section.
Figure 10E:
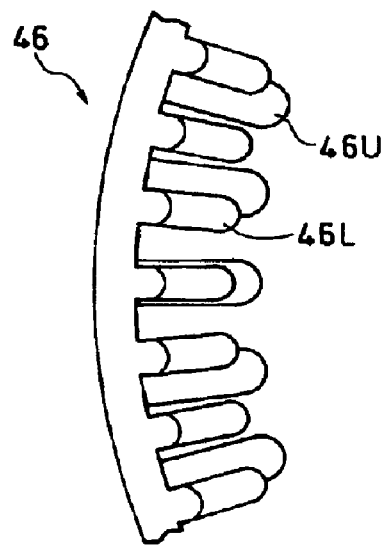
FIG. 10E is an enlarged drawing of a portion D of FIG. 10D.
Figure 11:
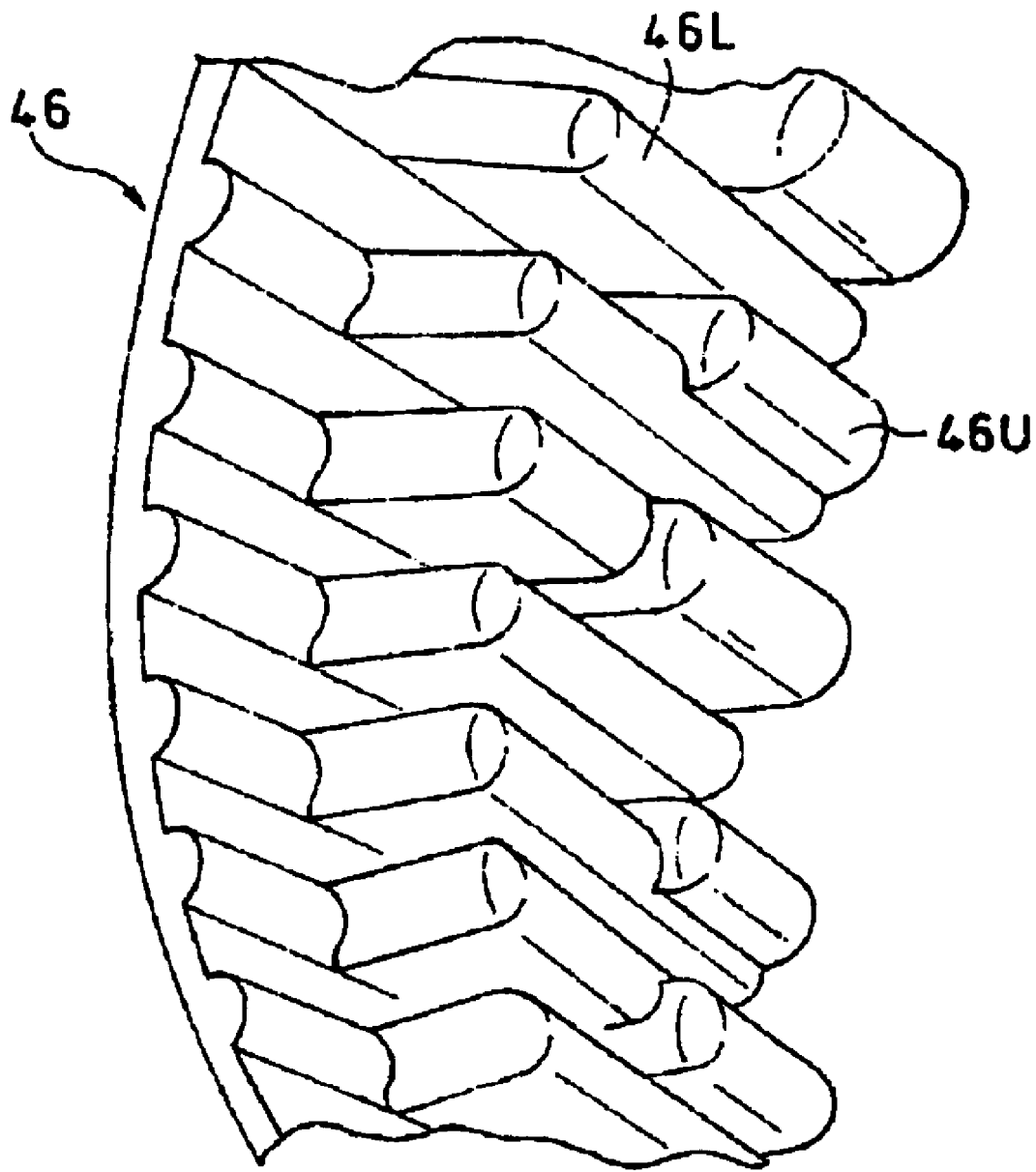
FIG. 11 is an enlarged perspective view of the portion D of FIG. 10D.

FIGS. 10A to 10E show the engaging member 46 screwed into the lower end of the inner cylinder 44. FIG. 10A and FIG. 10B are cross-sectional views of the engaging member 46 taken along different cross-sections, FIG. 10C is a plan view, FIG. 10D is a bottom view, and the right half of FIG. 10D is a cross-section thereof. FIG. 10E is an enlarged view of a part D in FIG. 10D. FIG. 11 is an enlarged perspective view of the part D in FIG. 10D.

The engaging member 46 is significantly characterized in having engaging teeth 46U and 46L on upper and lower levels. In FIG. 10A, the engaging teeth in the upper and lower levels are shown in cross-section, and in FIG. 10B, the engaging teeth in the upper and lower levels are not shown in cross-section.

The engaging member 46 is shown in detail. The engaging member 46 is formed into a flat cylindrical shape having a flange 46*a* on the upper surface thereof. As shown in FIG. 10C, a hole 46*d* having a flat surface on part of the inner periphery thereof is formed in the flange 46*a*. The engaging member 46 is mounted to the inner cylinder 44 so as to be capable of rotating integrally therewith by engaging the flat surface of the hole 46*d* and the notched surface 44*d* at the lower end of the inner cylinder 44 and securing the engaging member 46 to the lower end of the inner cylinder 44 with the screw 48*b*.

As shown in FIG. 10A, FIG. 10B, FIG. 10E, and FIG. 11, the engaging teeth 46U and the engaging teeth 46L are formed on an inner portion of a large hole formed on an end surface opposite from the end surface of the engaging member 46 where the flange 46*a* is formed. The engaging teeth 46U on the upper level is formed so as to project inwardly (radially inwardly) with respect to the engaging teeth 46L on the lower level formed at a position shallower than that. In other words, an envelope circle at a distal end of the engaging teeth extending radially inwardly of the engaging teeth 46U on the upper level is smaller in diameter than an envelope circle at a distal end of the engaging teeth 46L which extends radially inwardly thereof.

The diameter of the envelope circle of the engaging teeth 46U on the upper level is formed into a shape slightly larger than the envelope circle defined by a bottom of engaging groove 132A on the peripheral surface of the mode switch 122A of the camera 110A. Sixty teeth are formed as the upper engaging teeth 46U at a pitch of 6° as in the case of engaging groove 132A. On the other hand, the diameter of the envelope circle of the lower engaging teeth 46L is larger than an envelope circle defined by a bottom of the engaging groove 132B on the peripheral surface of the mode switch 122B of the camera 110B. Forty-five engaging teeth are formed as the lower engaging teeth 46L at a pitch of 8° as in the case of the engaging groove 132B. In other words, the upper engaging teeth 46U is formed so as to be capable of engaging with the engaging grooves 132A on the peripheral surface of the mode switch 122A of the camera 110A and the lower engaging teeth 46L is formed so as to be capable of engaging with the engaging groove 132B on the peripheral surface of the mode switch 122B of the camera 110B. In this manner, the engaging members 46U, 46L can be fitted to (engaged with) the mode switches 122A, 122B respectively, and can be rotated integrally after having fitted.

Figure 12B:
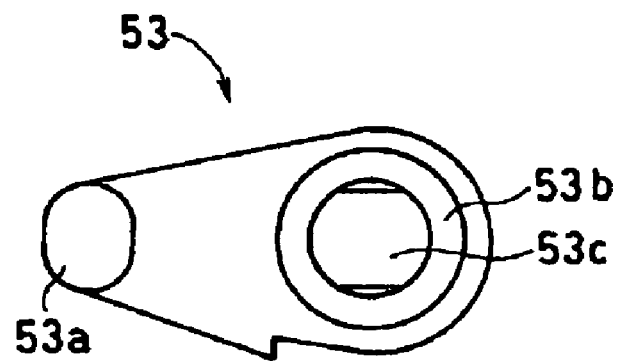
FIG. 12B is a plan view of the lever of the power dial operating member.
Figure 12A:
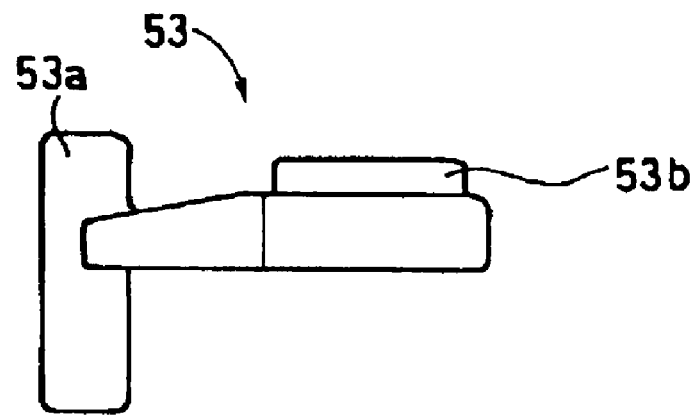
FIG. 12A is a front view of a lever of a power dial operating member.
Figure 12C:
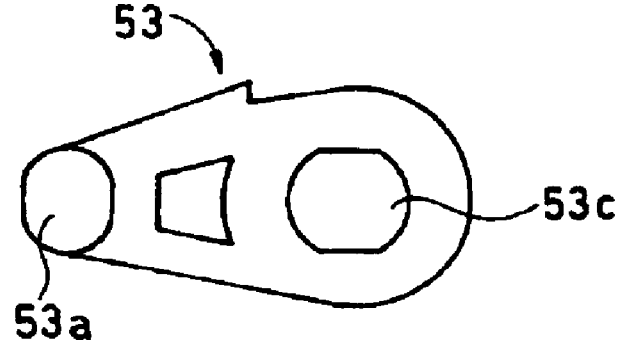
FIG. 12C is a bottom view of the lever of the power dial operating member.

Subsequently, members that constitute the power switch operating member 21 as the outer cylinder structure will be described. FIGS. 12A to 12C show a lever 53. FIG. 12A is a front view, FIG. 12B is a plan view, and FIG. 12C is a bottom view. As shown in FIGS. 12A to 12C, FIG. 4 and FIG. 5, the lever 53 includes a grip portion 53*a* of a T-shape and a flange 53*b* with a through-hole 53*c*. A lower half portion of the through-hole 53*c* is formed into an elongated groove having flat surfaces on both sides of the inner peripheral surfaces thereof, that is, an oval shaped hole 53*c*.

Figure 13B:
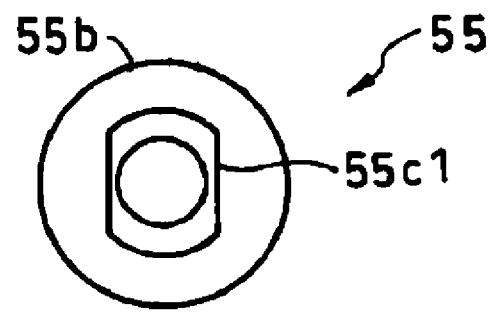
FIG. 13B is a plan view of the outer cylinder of the power dial operating member.
Figure 13A:
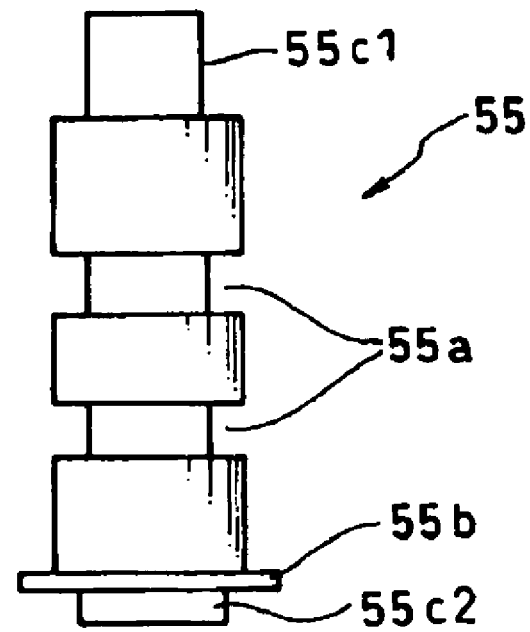
FIG. 13A is a front view of an outer cylinder of the power dial operating member.
Figure 13C:
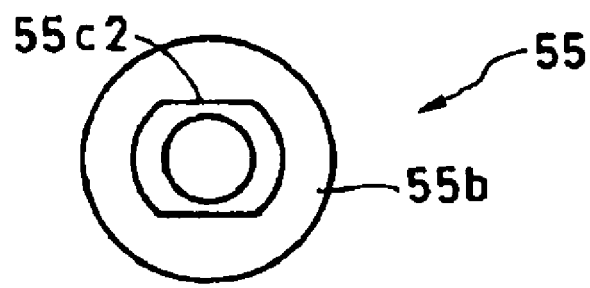
FIG. 13C is a bottom view of the outer cylinder of the power dial operating member.

FIGS. 13A to 13C show the outer cylinder 55, FIG. 13A is a front view, FIG. 13B is a plan view, FIG. 13C is a bottom view. As shown in FIGS. 13A to 13C, FIG. 4 and FIG. 5, the outer cylinder 55 is formed into a hollow shape in which the inner cylinder 44 can be stored, and includes two small-diameter portions 55*a* on the outer periphery thereof at the axial midsection and a flange-shaped stopper 55*b* of a larger diameter on the lower end portion thereof. The upper end portion and the lower end portion located on the lower side than the stopper are formed with the notched surfaces 55*c*1, 55*c*2 formed by cutting the both side surfaces on the outer peripheral surface thereof in parallel to each other, respectively. In this case, the notched surface 55*c*2 on the lower end portion thereof is formed at a position shifted from the notched surface 55*c*1 on the upper end portion by 90° in the circumferential direction. The lever 53 is fitted on the upper end portion of the outer cylinder 55 so as to be capable of rotating integrally therewith by fitting the elongated groove-shaped hole of the through-hole 53*c* on the lever to the notched surface 55*c*1 on the upper end portion. As described later, an engaging member 57 is fitted to the notched surface 55*c*2 at the lower end so as to be capable of rotating integrally. The O-ring 59*a* is fitted to the small diameter portion 55*a* to achieve sealing with respect to an insertion hole 12*a* formed on the back lid member 12-2 of the housing body 12 of the waterproof housing.

Figure 14B:
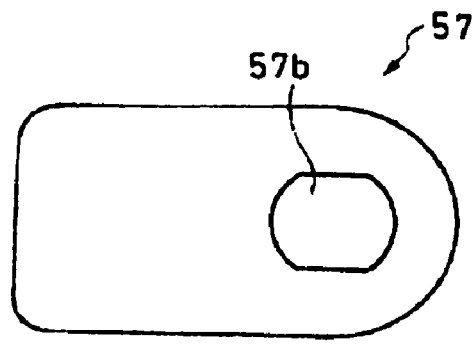
FIG. 14B is a plan view of the engaging member of the power dial operating member.
Figure 14A:
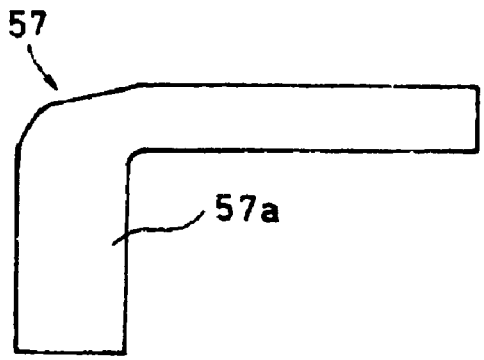
FIG. 14A is a front view of an engaging member of the power dial operating member.
Figure 14D:
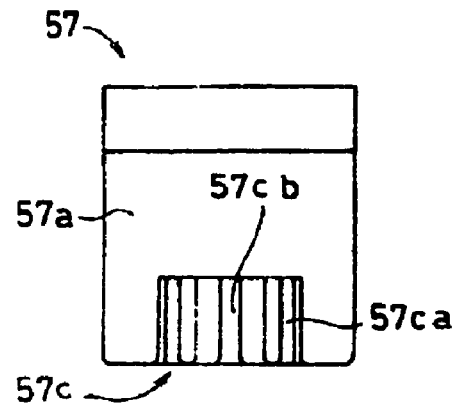
FIG. 14D is a right side view of the engaging member of the power dial operating member.
Figure 14C:
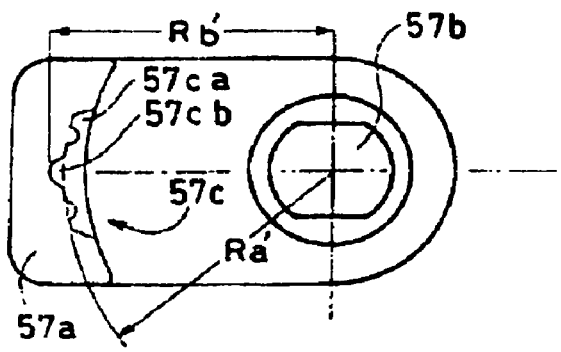
FIG. 14C is a bottom view of the engaging member of the power dial operating member.

FIGS. 14A to 14D show the engaging member 57. FIG. 14A is a front view, FIG. 14B is a plan view, FIG. 14C is a bottom view, and FIG. 14D is a right side view. In addition to FIGS. 14A to 14D, as shown in FIG. 4 and FIG. 5, the engaging member 57 is formed into a substantially L-shape including an arm portion extending in the radial direction, and a downwardly bent portion 57*a* at a distal end of the arm portion. The engaging member 57 includes a through-hole 57*b* and is formed with an elongated groove shaped (oval-shaped) hole having flat surfaces on both sides of the inner peripheral surfaces. The elongated groove-shaped through-hole 57*b* is fitted to the notched surface 55*c*2 on the lower end portion of the outer cylinder, so that the engaging member 57 is fitted to the lower end of the outer cylinder 55 so as to be capable of rotating integrally therewith.

Formed on an inner surface of a distal end of the downwardly bent portion 57a is, for example, an engaging recessed portion (engaging groove) 57c in the shape of the vertical groove extending in parallel with the center axis of the through-hole 57b. The engaging recessed portion 57c includes two types of engaging portions, and an engaging recessed portion 57cb that can engage with the engaging portion 131B (see FIG. 3C and FIG. 3D) on the switch strip 121Ba of the power switch 121B of the camera 110B is formed at a center thereof. Formed in the periphery of the engaging recessed portion 57c is an engaging recessed portion 57ca that can engage with the engaging portion 131A (see FIG. 3A and FIG. 3B) of the switch strip 121Aa of the power switch 121A of the camera 110A. In other words, the distance Rb" from the radial bottom of the engaging recessed portion 57cb at the center to a center of the through-hole 57b is slightly larger than the distance Rb from a distal end of the engaging portion 131B of the switch strip 121Ba to a center of rotation of the power switch 121B. The distance Ra" from the radial bottom of the peripheral engaging recessed portion 57ca to the center of the through-hole 57b is slightly larger than the distance Ra from the outer diameter of the engaging portion 131A of the power switch strip 121Aa to the center of rotation of the power switch 121A.

As described above, the tab 42 is mounted to the upper end of the inner cylinder 44 and the engaging member 46 is mounted to the lower end thereof so as to be capable of rotating integrally with the inner cylinder using the notched surfaces 44c1, 44d on the upper and lower end portions of the inner cylinder 44. The lever 53 is mounted to the upper end of the outer cylinder 55 and the engaging member 57 is mounted to the lower end thereof so as to be capable of rotating integrally with the outer cylinder using the notched surfaces 55c1, 55c2 on the upper and lower end portions of the outer cylinder 55.

Therefore, by rotating the inner cylinder 44 by operating the tab 42, the engaging member 46 is rotated in conjunction with the tab 42. By operating the lever 53 and rotating the outer cylinder 55, the engaging member 57 is rotated in conjunction with the lever.

Therefore, the dual cylinder structure is assembled to the insertion hole 12a formed on the back lid member 12-2 as described below.

The inner cylinder 44 having the O-ring 48a mounted thereon is first fitted into the inner periphery of the outer cylinder 55 to which the O-ring 59a is mounted, and then these members are inserted into the insertion hole 12a formed on the back lid member 12-2. Then, the lever 53 is fitted and inserted into the end portion of the outer cylinder 55 from the outside of the back lid member 12-2, then the tab 42 is fitted and inserted into the end portion of the inner cylinder 44, and then the screw 48b is screwed into the end portion of the inner cylinder 44. Subsequently, the engaging member 57 is fitted and inserted into the end portion of the outer cylinder 55 inside the back lid member 12-2, then the engaging member 46 is fitted and inserted into the end portion of the inner cylinder 44, and then the screw 48b is screwed into the end portion of the inner cylinder 44.

The dual cylinder structure can be moved relatively in the insertion hole 12a via the O-ring 59a in the axial direction. However, the axial movement is limited by the stopper 55b on the lower end of the outer cylinder 55 and the lever 53.

The operation of the power switch operating member 21 formed of the outer cylinder structure and the mode switch operating member 22 formed of the inner cylinder structure of the dual cylinder structure 40 will be described.

As described in conjunction with FIGS. 14A to 14D, the engaging recessed portion 57c including two types of engaging portions are formed on the inner surface of the engaging member 57 of the power switch operating member 21. The engaging recessed portion 57cb at the center of the engaging recessed portion 57c can engage with (fitted to) the engaging portion 131B of the switch strip 121Ba of the power switch 121B of the camera 110B. On the other hand, the engaging recessed portion 57ca in the periphery of the engaging recessed portion 57c can engage with (fitted to) the engaging portion 131A of the switch strip 121Aa of the power switch 121A of the camera 110A.

Figure 15:
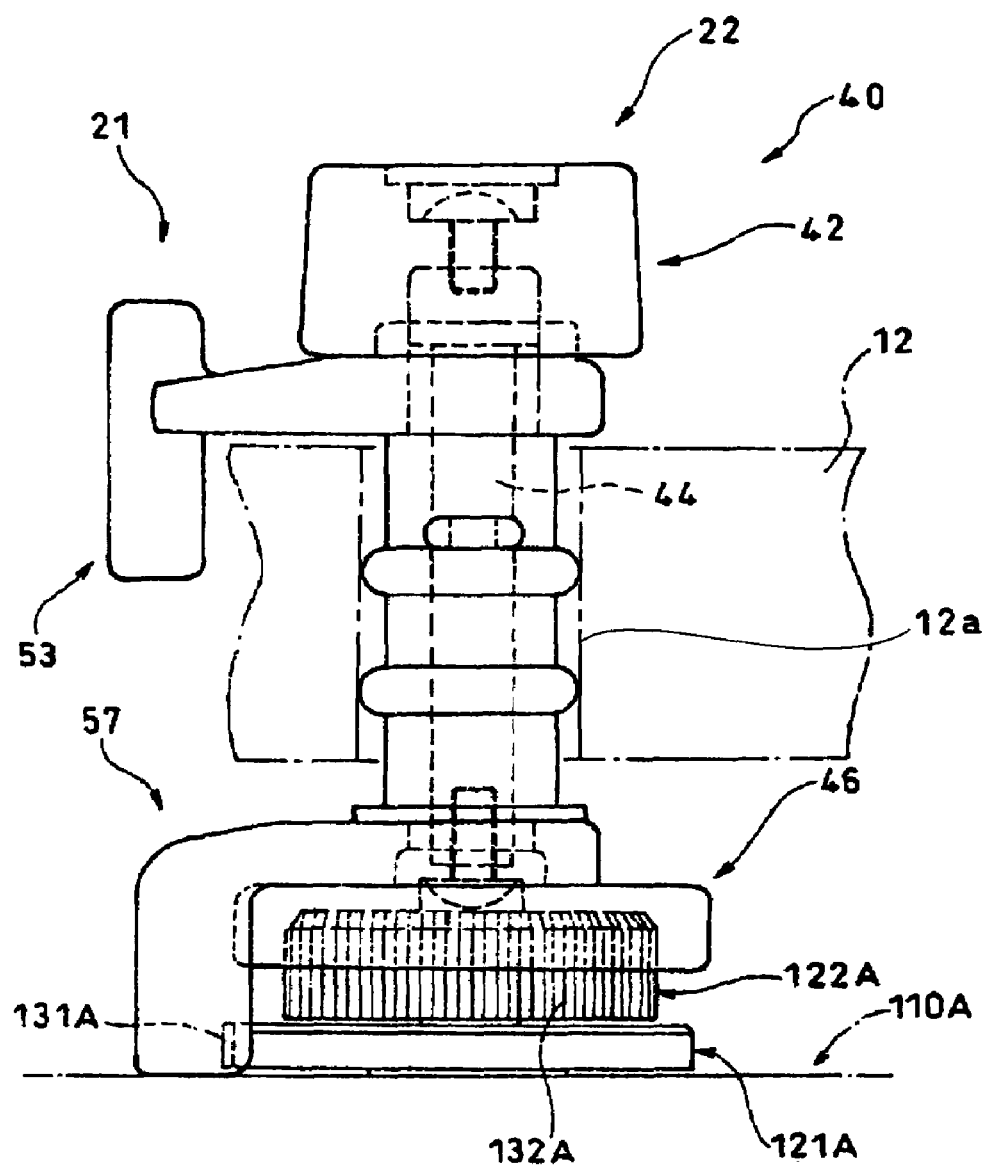
FIG. 15 is a schematic view showing a relation of a power switch operating member and a mode switch operating member of the waterproof housing, with respect to a power switch and a mode switch of a camera, in a case in which the camera is stored in the waterproof housing.
Figure 16:
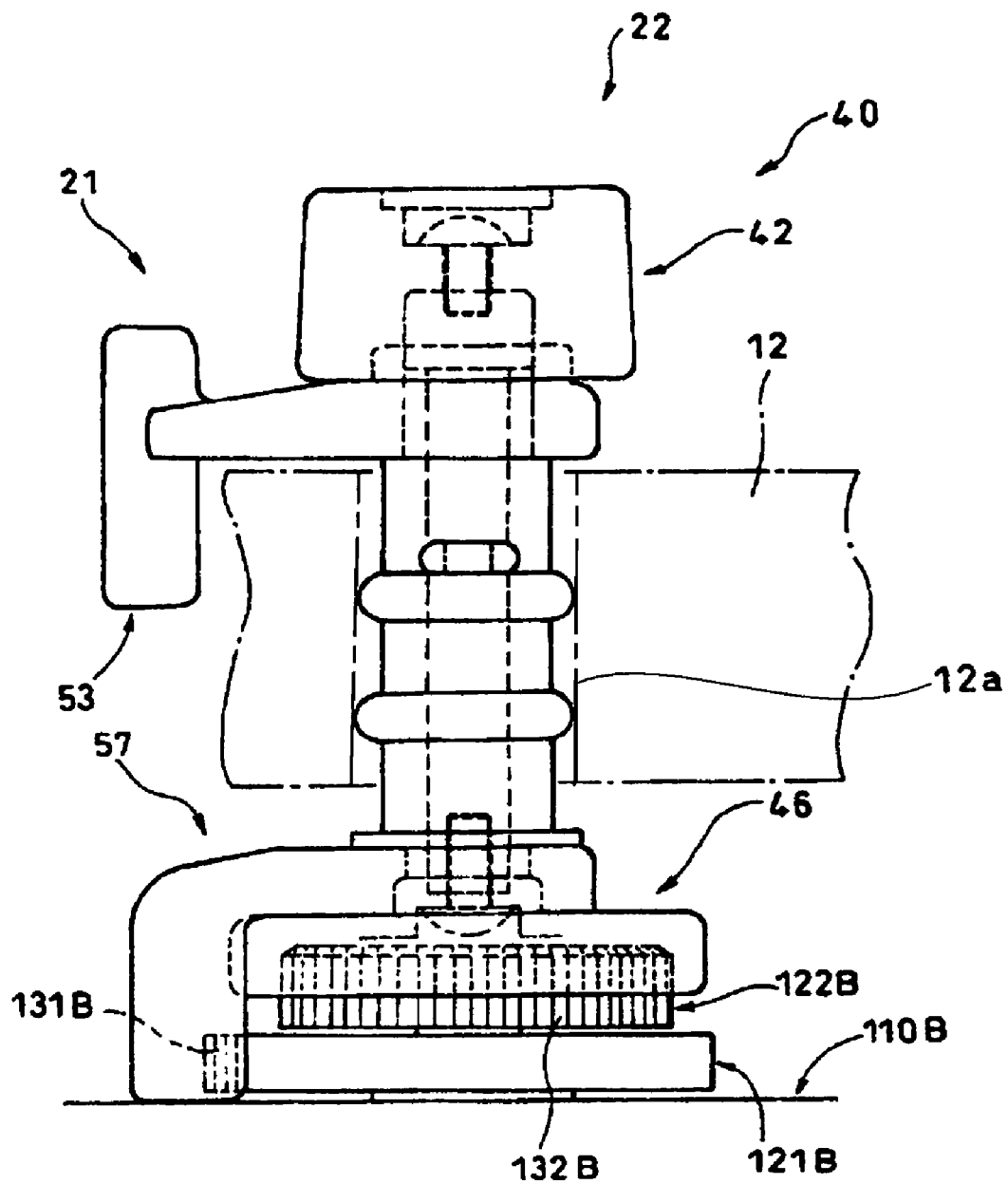
FIG. 16 is a schematic drawing showing a relation of a power switch operating member and a mode switch operating member of the waterproof housing with respect to a power switch and a mode switch of a camera in a case in which a camera different from the one shown in FIG. 15 is stored in the waterproof housing.

FIG. 15 and FIG. 16 are schematic drawings showing relations between the power switch operating member 21 and the mode switch operating member 22 of the waterproof housing, and the power switches 121A, 121B and the mode switches 122A, 122B of the camera in a case in which the cameras 110A, 110B are stored in the waterproof housing 10.

For example, as shown in FIG. 15, when the camera 110A is stored in the waterproof housing 10, the engaging member 46 of the mode switch operating member 22 is covered on the mode switch 122A, and the upper engaging teeth 46U on the peripheral surface of the engaging member 46 engages with the engaging grove 132A of the mode switch 122A. The engaging member 57 of the power switch operating member 21 is positioned so as to embrace the engaging portion 131A of the power switch 121A of the camera from the side, the peripheral engaging recessed portion 57ca of the engaging member 57 engages with the engaging portion 131A of the switch strip 121Aa of the power switch 121A.

The camera 110A is stored in the waterproof housing 10 and the power switch 121A, the mode switch 122A enter under the engaging members 57, 46. Therefore, the engaging groove 132A of the mode switch 122A engages with the upper engaging teeth 46U of the engaging member 46, and the engaging portion 131A of the switch strip 121Aa of the power switch 121A engages with the peripheral engaging recessed portion 57ca of the engaging member 57 respectively without a hitch.

The position of the lever 53 in FIG. 2B is assumed to be an initial OFF position of the power switch 121A. In FIG. 2, when the user grips the lever 53 and rotates the same in the direction indicated by an arrow, the engaging member 57 of the power switch operating member 21 rotates integrally with the lever 53, and the switch strip 121Aa which engages with the engaging member 57 is rotated with the power switch 121A, so that the power switch 121A is switched from OFF to ON. When the lever 53 is rotated in the direction opposite from the direction indicated by the arrow to return the same to the initial position, the power switch 121A is switched to OFF. In this manner, by the rotation of the lever 53 of the power switch operating member 21, the power switch 121A is switched between ON and OFF from the outside of the camera.

When the tab 42 is pinched and rotated, the engaging member 46 is rotated integrally with the tab 42 and the mode switch 122A which engages with the engaging member 46 is rotated to a desired mode position and hence the photographing mode is set. In this manner, the photographing mode of the mode switch 122A is set by the tab 42 of the mode switch operating member 22 from the outside of the camera.

The tab 42 functions as an operating member of the mode switch 122A and the lever 53 functions as an operating member of the power switch 121A.

In the same manner, as shown in FIG. 16, when the camera 110B is stored in the waterproof housing 10, the engaging member 46 of the mode switch operating member 22 is covered on the mode switch 122B, and the lower engaging teeth 46L on the peripheral surface of the engaging member 46 engages with the engaging groove 132B of the mode switch 122B. The engaging recessed portion 57cb at the center of the engaging member 57 of the power switch operating member 21 engages with the engaging portion 131B of the switch strip 121Ba of the power switch 121B. Therefore, when the lever 53 is rotated, the engaging member 57 of the power switch operating member 21 rotates integrally with the lever 53, and the switch strip 121Ba which engages with the engaging member 57 is rotated with the power switch 121B, whereby the power switch 121B is switched between ON and OFF. When the tab 42 is rotated, the engaging member 46 rotates integrally with the tab 42, and the mode switch 122B which engages with the engaging member 46 is also rotated, whereby a predetermined photographing mode is set.

In this manner, switching of the power switch 121B can be operated from the outside of the camera 110B with the lever 53 of the power switch operating member 21, and the photographing mode of the mode switch 122B can be set from the outside of the camera with the tab 42 of the mode switch operating member 22.

As described above, in the invention, the power switch operating member 21 and the mode switch operating member 22 of the waterproof housing 10 is adapted to be capable of being engaged with the rotary dials, such as the power switch and the mode switch, on the different cameras, such as the cameras 110A, 110B. Therefore, any of the rotary dials (for example, the power switch or the mode switch) can be operated from the outside of the camera of the plurality of different cameras 110A, 110B. Therefore, the waterproof housing 10 is used commonly with respect to the plurality of different cameras, and hence the general versatility of the waterproof housing is enhanced.

In this embodiment, the two cameras 110A, 110B are considered as the different cameras. However, by providing three or more of the different engaging grooves as the engaging grooves of the engaging members 46, 57 of the waterproof housing 10, which engage with the rotary dials (the power switch 121 and the mode switch 122) of the camera, the rotary dials of three or more different cameras can be operated from the outside. In other words, by modifying the shape of the engaging grooves (engaging recessed portions) of the engaging members 46, 57 of the waterproof housing 10 while taking factors such as the shape of the rotary dials including the diameter or the height thereof, the pitch of the engaging grooves on the peripheral surface thereof of the cameras into consideration, the waterproof housing 10 with high general versatility in which the rotary dials of a number of the different cameras can be operated from the outside of the cameras is obtained.

In this embodiment, the power switch 121 and the mode switch 122 are considered as the rotary dials of the camera, which can be operated from the outside. However, the operating member of the camera to be operated must simply be the rotary dial, and is not limited to the power switch and the mode switch.

In the case of the camera in which the rotary dials (for example, the power switch 121 and the mode switch 122) are provided coaxially in an overlapped manner, the two dial engaging members (the power switch operating member 21 and the mode switch operating member 22) may be formed into the dual structure, and the inner cylinder structure and the outer cylinder structure may be used as the dial engaging member thereof respectively. In this arrangement, the structure of the dial engaging member can be simplified and downsized.

The engaging members 46, 57 that are engaged with the rotary dials (the power switch 121 and the mode switch 122) of the camera are normally formed of synthetic resin, light alloy, and the like. However, by forming the engaging members 46, 57 of viscous soft material, such as rubber, these members can be engaged reliably without giving damage to the engaging grooves on the peripheral surface of the rotary dials. Therefore, the rotational force of the operating member (tab 42, the lever 53) of the dial engaging member is accurately transmitted to the rotary dials of the camera, and the rotary dial can be rotated without a hitch.

According to the invention, since any of the rotary dials of the plurality of different cameras can be operated from the outside of the camera, the waterproof housing can be used commonly for the plurality of different cameras, and hence the invention can be applied widely to the field which requires high general versatility.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A waterproof housing for a camera comprising:
 a housing body that enables a user to store one of a plurality of cameras different from each other exchangeably;
 a first engaging member rotatably provided in the housing body and capable of engaging with first rotary members provided on the plurality of cameras respectively, the first engaging member rotating the first rotary member of the camera stored in the housing body; and
 a second engaging member rotatably provided in the housing body and capable of engaging with second rotary members provided on the plurality of cameras respectively, the second engaging member rotating the second rotary member of the camera stored in the housing body,
 wherein the first engaging member is rotatable by a first shaft member and the second engaging member is rotatable by a second shaft member, and the first shaft member and the second shaft member are rotatable about the identical axis.

2. The waterproof housing for a camera according to claim 1, wherein the first shaft member is arranged within the second shaft member so as to be capable of relative rotation.

3. The waterproof housing for a camera according to claim 1, wherein
 the first engaging member engages with first engaging grooves provided on an exposed portion of the first rotary member provided on the camera, and
 the second engaging member engages with second engaging grooves provided on an exposed portion of the second rotary member provided on the camera.

4. The waterproof housing for a camera according to claim 1, wherein the first engaging member comprises a plurality of types of projections for engaging with first engaging grooves provided on an exposed portion of the first rotary member, and the second engaging member comprises a plurality of types of projections for engaging with second engaging grooves provided on an exposed portion of the second rotary member.

5. The waterproof housing for a camera according to claim 1, wherein the first engaging member engages with the rotary member so as to cover an exposed portion of the first rotary member.

6. The waterproof housing for a camera according to claim 1, wherein the first rotary member is a mode dial of the camera, and the second rotary member is a power switch of the camera.

7. The waterproof housing for a camera according to claim 1, further comprising:

a first operating member that rotates integrally with the first shaft member so that the first engaging member can be rotated; and a second operating member that rotates integrally with the second shaft member so that the second engaging member can be rotated.

* * * * *